(12) United States Patent
Mostafa et al.

(10) Patent No.: US 11,864,257 B2
(45) Date of Patent: Jan. 2, 2024

(54) CELL SELECTION OPTIMIZATION DURING RRC REESTABLISHMENT

(71) Applicant: Apple Inc., Cupertino, CA (US)

(72) Inventors: Amr Mostafa, Munich (DE); Ammar Tahir, Munich (DE); Bernd H. Kemmer, Munich (DE); Karim Elbehaidy, Neubiberg (DE); Prasad P. Ashtekar, Munich (DE)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 17/448,788

(22) Filed: Sep. 24, 2021

(65) Prior Publication Data
US 2023/0098520 A1  Mar. 30, 2023

(51) Int. Cl.
*H04W 76/19* (2018.01)
*H04W 36/08* (2009.01)
*H04W 36/16* (2009.01)

(52) U.S. Cl.
CPC .......... *H04W 76/19* (2018.02); *H04W 36/08* (2013.01); *H04W 36/16* (2013.01)

(58) Field of Classification Search
None
See application file for complete search history.

(56) References Cited

U.S. PATENT DOCUMENTS

| | | | | |
|---|---|---|---|---|
| 10,334,655 | B2 * | 6/2019 | Qin | H04W 36/0072 |
| 10,999,885 | B1 * | 5/2021 | Shih | H04W 74/0833 |
| 2015/0049600 | A1 * | 2/2015 | Balasubramanian | H04W 76/40 370/216 |
| 2017/0048898 | A1 | 2/2017 | Jung et al. | |
| 2017/0171903 | A1 * | 6/2017 | Kubota | H04W 36/165 |
| 2017/0367107 | A1 * | 12/2017 | Comsa | H04W 72/1215 |
| 2017/0374574 | A1 * | 12/2017 | Lee | H04W 24/08 |
| 2019/0037635 | A1 * | 1/2019 | Guo | H04W 76/27 |
| 2019/0387440 | A1 * | 12/2019 | Yiu | H04W 36/165 |
| 2020/0383022 | A1 * | 12/2020 | Shrestha | H04W 76/27 |
| 2021/0051550 | A1 | 2/2021 | Latheef et al. | |
| 2021/0068016 | A1 * | 3/2021 | Shi | H04W 76/27 |
| 2021/0314828 | A1 * | 10/2021 | Kim | H04W 36/0058 |
| 2022/0007254 | A1 * | 1/2022 | Da Silva | H04W 36/0016 |

(Continued)

FOREIGN PATENT DOCUMENTS

| | | | | |
|---|---|---|---|---|
| EP | 3 796 711 | | 3/2021 | |
| EP | 4120770 | A1 * | 1/2023 | H04L 5/001 |

(Continued)

OTHER PUBLICATIONS

Qualcomm Incorporated, "LTE Conditional HO failure handling", 3GPP TSG-RAN WG2 Meeting #106, r2-1906662, May 13, 2019, 4 sheets.

*Primary Examiner* — Kenny S Lin
(74) *Attorney, Agent, or Firm* — Fay Kaplun & Marcin, LLP

(57) ABSTRACT

A user equipment (UE) is configured to receive a mobility configuration from a source cell of a network, wherein the mobility configuration includes at least one mobility measurement object, determine that a radio link failure (RLF) event has occurred on the source cell, searching for a primary cell (PCell) only on frequencies associated with the at least one mobility measurement object to reestablish a radio resource control (RRC) connection and reestablish the RRC connection with the PCell.

18 Claims, 8 Drawing Sheets

(56) References Cited

U.S. PATENT DOCUMENTS

| | | | |
|---|---|---|---|
| 2022/0053394 A1* | 2/2022 | Kim | H04W 36/0058 |
| 2022/0070752 A1* | 3/2022 | Kim | H04W 36/32 |
| 2022/0217598 A1* | 7/2022 | Ishii | H04W 36/305 |
| 2022/0361057 A1* | 11/2022 | Kim | H04W 36/34 |
| 2023/0099609 A1* | 3/2023 | Xu | H04W 36/0033 |
| | | | 370/331 |
| 2023/0103163 A1* | 3/2023 | Xu | H04W 36/0016 |
| | | | 370/331 |
| 2023/0145958 A1* | 5/2023 | Wu | H04W 36/0061 |
| | | | 370/331 |
| 2023/0239751 A1* | 7/2023 | Kim | H04W 76/20 |
| | | | 370/331 |

FOREIGN PATENT DOCUMENTS

| | | |
|---|---|---|
| WO | 2020/117114 | 6/2020 |
| WO | WO-2021220937 A1 * | 11/2021 |

* cited by examiner

CELL SELECTION OPTIMIZATION DURING RRC REESTABLISHMENT

BACKGROUND INFORMATION

While a user equipment (UE) is in a radio resource control (RRC) connected mode, the UE may need to reestablish the connection with the wireless network based on different triggers such as, for example, a radio link failure (RLF), a handover (HO) failure, etc. To reestablish the connection, the UE initiates an RRC connection reestablishment procedure that is defined by the 3GPP standards. From the time the RRC connection reestablishment procedure is initiated until it is successfully completed, user-plane data transfer is suspended.

SUMMARY

Some exemplary embodiments are related to a processor of a user equipment (UE) configured to perform operations. The operations include receiving a mobility configuration from a source cell of a network, wherein the mobility configuration includes at least one mobility measurement object, determining that a radio link failure (RLF) event has occurred on the source cell, searching for a primary cell (PCell) only on frequencies associated with the at least one mobility measurement object to reestablish a radio resource control (RRC) connection and reestablishing the RRC connection with the PCell.

Other exemplary embodiments are related to a user equipment (UE) having a transceiver configured to communicate with a network and a processor communicatively coupled to the transceiver and configured to perform operations. The operations include receiving a mobility configuration from a source cell of the network, wherein the mobility configuration includes at least one mobility measurement object, determining that a radio link failure (RLF) event has occurred on the source cell, searching for a primary cell (PCell) only on frequencies associated with the at least one mobility measurement object to reestablish a radio resource control (RRC) connection and reestablishing the RRC connection with the PCell.

DETAILED DESCRIPTION

Figure 1:
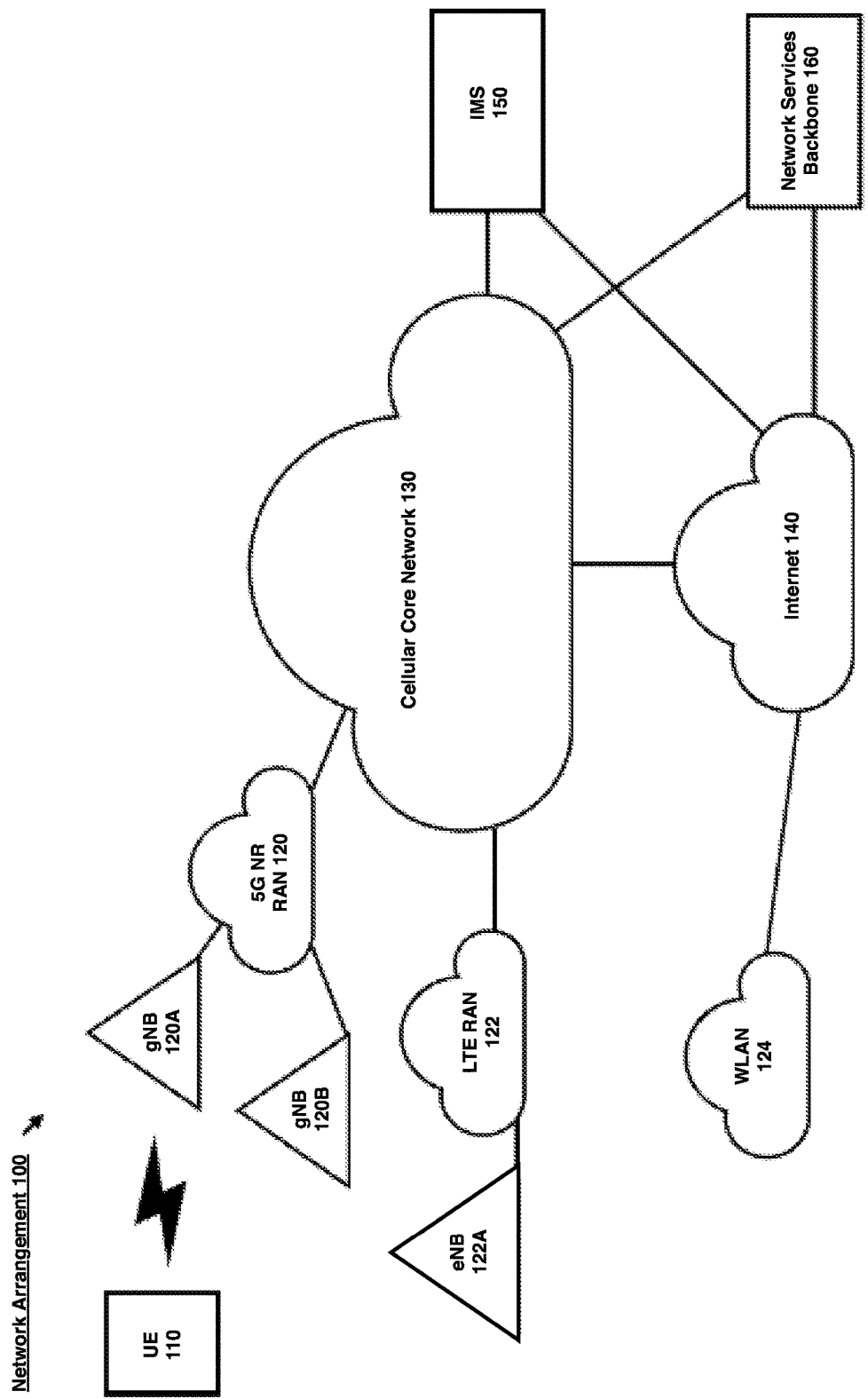
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to operations by a user equipment (UE) for improving a radio resource configuration (RRC) connection reestablishment procedure.

In the following description, reference to a "suitable" primary cell (PCell) is used. The meaning of the term "suitable" or "suitable cell" should be understood to be the same as that term is defined in the 3GPP standards, including TS 36.304 and TS 38.304, and any standards referenced by these standards.

A UE may be configured with a mobility configuration. The mobility configuration may include a conditional handover (CHO) configuration that indicates a target cell ID for each of the target cells for handover in a source configuration received from a source cell. The UE is not required to parse radio resource control (RRC) configuration data for the target cell(s), thus reducing a UE processing burden. In some exemplary embodiments, a downlink (DL) frequency is also provided to the UE for each measurement object corresponding to the target cells.

The mobility configuration may alternatively or additionally be a T312 Fast Failure Recovery configuration that includes measurement IDs corresponding to measurement objects on which the UE may perform measurements when a time to trigger (TTT) timer has expired. The UE then transmits measurement report(s) based on these measurements to the network. Successful reception of the measurement report(s) by the network may trigger the network to transmit a handover (HO) command to the UE. However, if the UE does not receive the HO command from the network before expiration of the T312 timer, the UE may initiate an RRC connection reestablishment procedure instead of waiting for expiration of a T310 timer.

In some cases, although the UE may be configured with a CHO, the UE may still attempt to perform an RRC connection reestablishment with a neighboring cell that is not a CHO configured cell but is found to be suitable based on its power. In such a scenario, the time that the user-plane data transfer is suspended is prolonged compared with a CHO RRC reestablishment because the UE must conduct the entire RRC connection reestablishment procedure.

In some exemplary embodiments, a UE that has been configured with a CHO may be configured to prioritize frequencies associated with the CHO measurement objects when searching for a suitable primary cell (PCell) with which to perform an RRC connection reestablishment. As a result, the probability that a CHO PCell is selected is increased, thus also increasing the likelihood of decreasing the user plane data transfer suspension time.

Another issue that arises is that a PCell with which the UE performs an RRC connection reestablishment may not be able to retrieve the UE context data from the last serving cell. In such a scenario, the UE would need to perform the entire RRC connection procedure with the new PCell (e.g., including access stratum (AS) security context), which requires an even longer period of time than an RRC connection reestablishment procedure in which the UE context information is retrievable from the last serving cell.

In some exemplary embodiments, a UE that has been configured with CHO measurement objects or T312 measurement objects may prioritize the frequencies associated with those measurement objects during its search for a suitable PCell with which to perform an RRC connection reestablishment. Because either of the CHO measurement objects or the T312 measurement objects lead to a HO to a PCell configured by the network, there is a high likelihood that the PCell will be able to obtain the UE context data from the last serving cell (compared to a cell that is independently found by the UE after RLF detection).

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
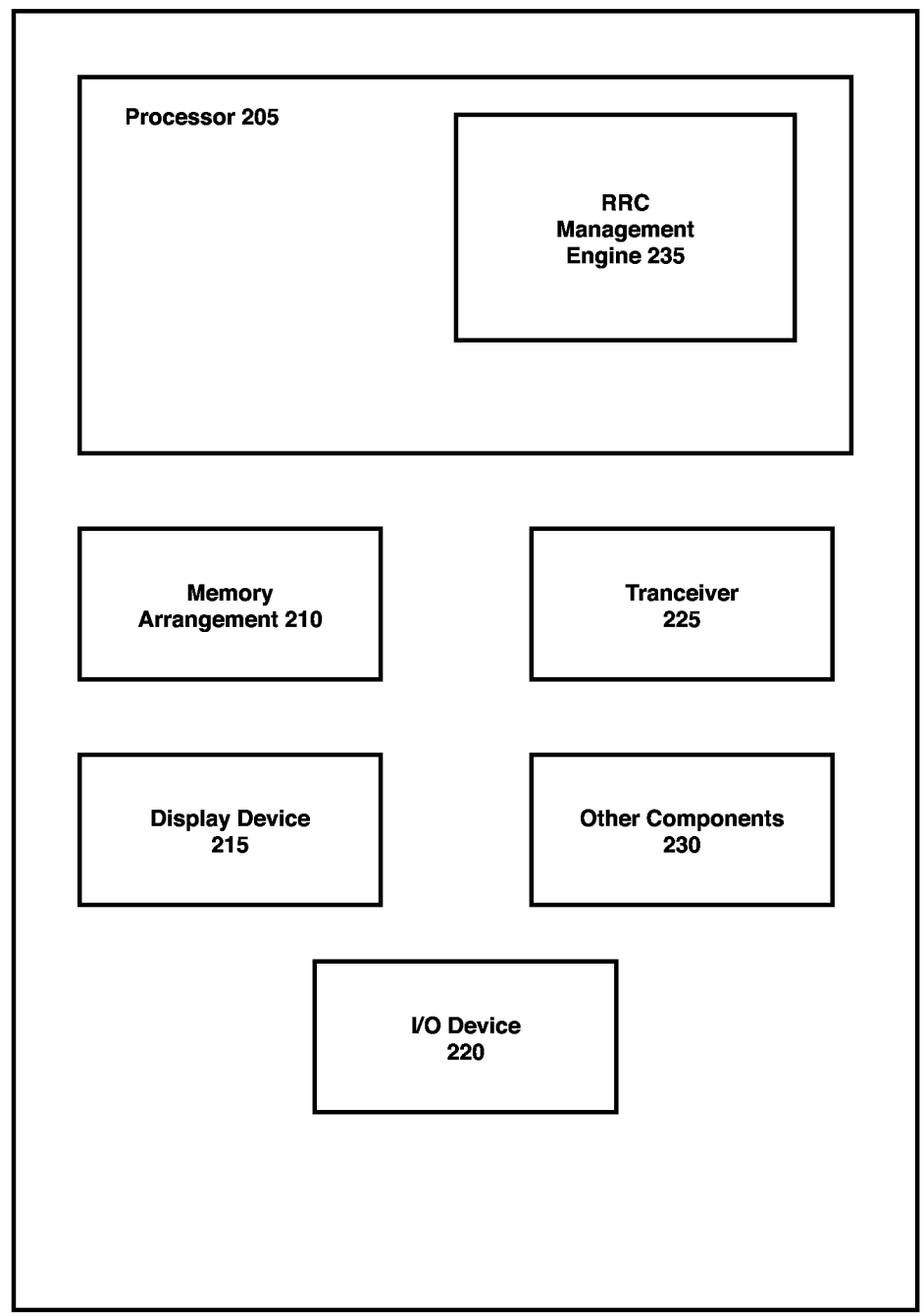
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include an RRC management engine 235. The RRC management engine 235 may perform various operations related to performing an RRC connection reestablishment on a primary cell (PCell) as configured by the network 100. Exemplary operations will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
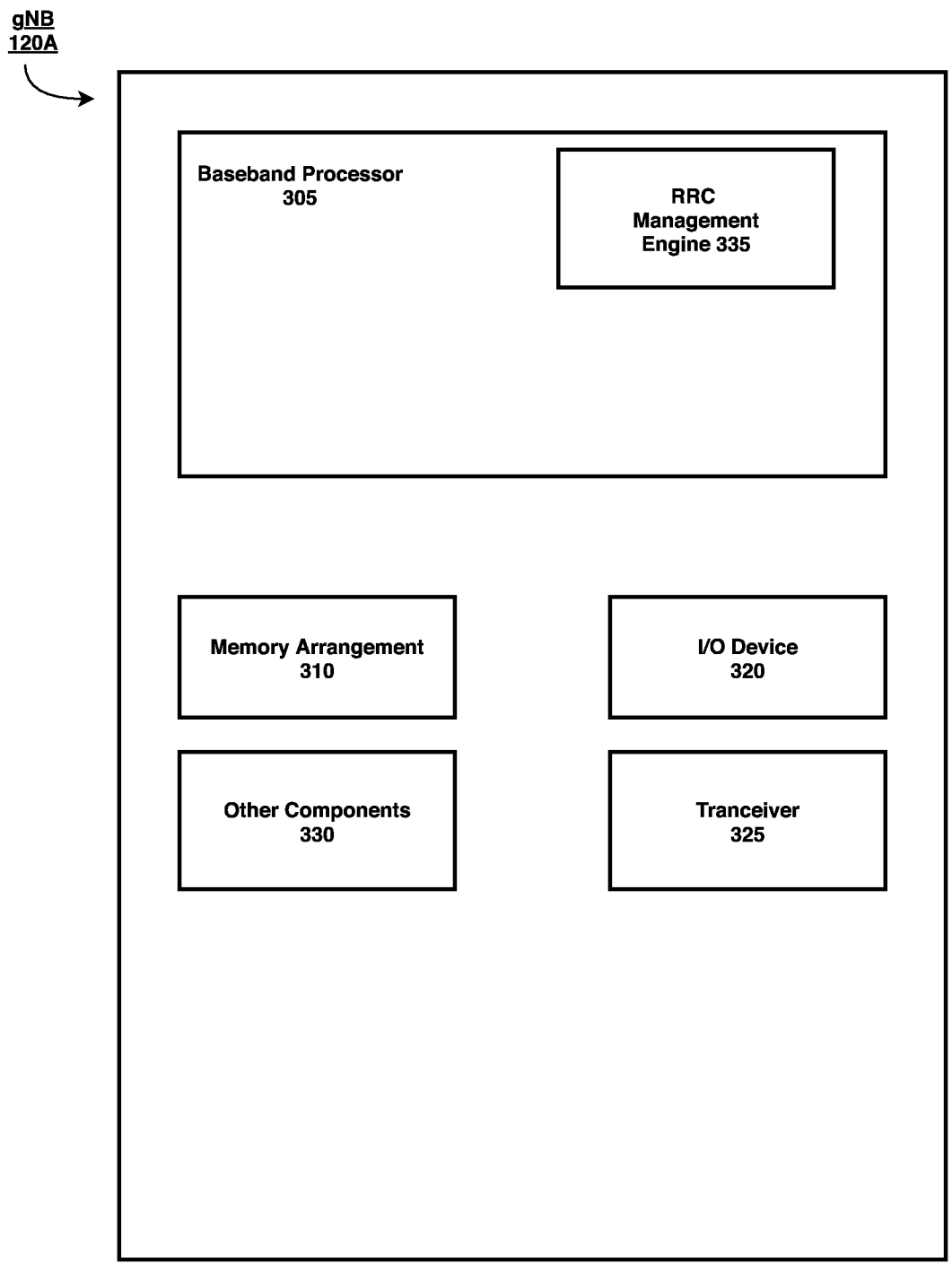
FIG. 3 shows an exemplary base station according to various exemplary embodiments.

FIG. 3 shows an exemplary network base station, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include an RRC management engine 335 for performing operations including configuring the UE 110 with measurement objects corresponding to target cells in a conditional handover (CHO) or T312 Fast Failure Recovery configuration. Examples of the operations will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4A:
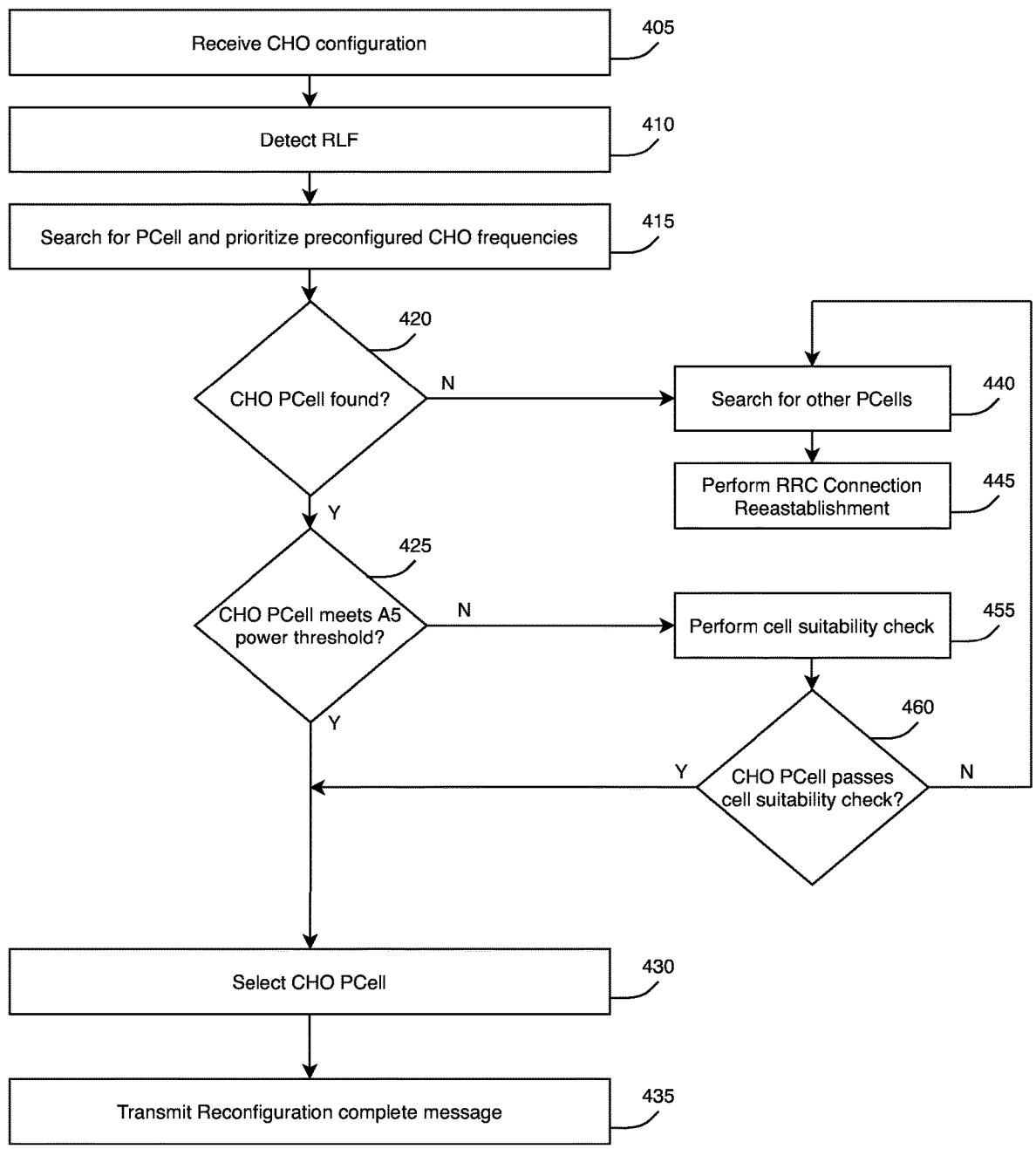
FIG. 4A shows a method of searching for a suitable primary cell (PCell) during a radio resource control (RRC) connection reestablishment procedure according to various exemplary embodiments.
Figure 4B:
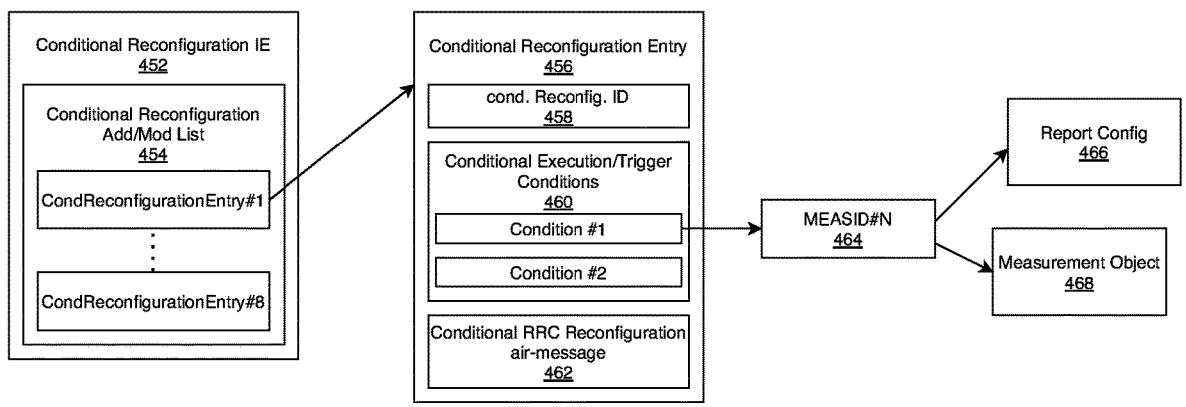
FIG. 4B shows an exemplary conditional handover (CHO) configuration according to various exemplary embodiments.

FIG. 4A shows a method 400 of searching for a suitable primary cell (PCell) during a radio resource control (RRC) connection reestablishment procedure according to various exemplary embodiments. FIG. 4B shows an exemplary conditional handover (CHO) configuration according to various exemplary embodiments. The method 400 will be described with reference to the exemplary conditional handover (CHO) configuration of FIG. 4B.

At 405, the UE 110 receives a CHO configuration (Conditional Reconfiguration IE 452) from a base station (e.g., gNB 120A). As shown in FIG. 4B, the CHO configuration includes a conditional reconfiguration add/mod list 454 that includes a plurality of conditional reconfiguration entries (8 shown in the example of FIG. 4B). Each conditional reconfiguration entry 456 includes a conditional reconfiguration ID 458, conditional execution/trigger conditions 460 that must be met for the CHO to be triggered, and a conditional RRC reconfiguration air-message 462 corresponding to the cell associated with the conditional reconfiguration entry 456. Once the conditions are met, the UE 110 may transmit a RRC configuration complete message to the corresponding cell to complete the RRC connection reestablishment instead of performing the typical RRC connection reestablishment procedure.

As illustrated in FIG. 4B, each condition of the conditional execution/trigger conditions 460 may include a measurement ID 464 that includes (i) a report configuration 466 in which the reportType information element (IE) is set to cond. Trigger Config and (ii) a measurement object 468 having a frequency corresponding to the candidate cell.

Returning to FIG. 4A, at 410, the UE 110 detects a radio link failure (RLF) on the serving PCell. At 415, the UE 110 searches for a suitable PCell, but prioritizes frequencies associated with measurement objects (measurement objects 468) corresponding to CHO configurations. The UE 110 may be configured with multiple measurement objects in addition to CHO measurement objects. By prioritizing the CHO frequencies, the probability that the UE 110 finds a CHO PCell is increased because the UE 110 will connect with the CHO PCell even if it finds another (non-CHO) PCell with better power than the CHO PCell. As a result, the probability of shortening the duration during which user plane data transfer is suspended is improved.

At 420, the UE 110 determines if a CHO PCell has been found. If a CHO PCell has been found, in some exemplary embodiments, the UE 110 may determine, at 425, whether that CHO PCell meets an A5 event power threshold (Mn+Ofn+Ocn−Hys>Thresh2) as defined in TS 38.331 of 3GPP standards. If the CHO PCell does not meet the A5 event power threshold, then the UE 110 performs a cell power suitability check at 455, which is defined in section 5.2.3.2 of 3GPP TS 36.304 or TS 38.304, both of which define conditions that should be met for a cell to be considered suitable for connection reestablishment. If the CHO PCell passes the cell suitability check, then the UE 110 selects the CHO PCell at 430. If, however, the CHO PCell does not pass the cell suitability check, then, at 440, the UE 110 continues searching for other PCells on CHO frequencies as well as other frequencies (e.g., on frequencies of other measurement objects other than the CHO frequencies). At 445, the UE performs the RRC connection reestablishment procedure with the PCell found at 440.

If, however, the CHO PCell does meet the A5 event power threshold at 425, then the UE 110 selects the CHO PCell at 430. At 435, the UE 110 transmits the RRC reconfiguration complete message to the CHO PCell to establish the RRC connection with the CHO PCell. In some embodiments, because the CHO PCell meets the A5 event power threshold, the UE 110 may skip the cell power suitability check defined in section 5.2.3.2 of 3GPP TS 36.304 or TS 38.304.

If the UE 110 does not find a CHO PCell at 420, then the method proceeds to 440, where the UE 110 continues searching for other PCells on CHO frequencies as well as other frequencies (e.g., on frequencies of other measurement objects other than the CHO frequencies). At 445, the UE performs the RRC connection reestablishment procedure with the PCell found at 440.

Figure 5:
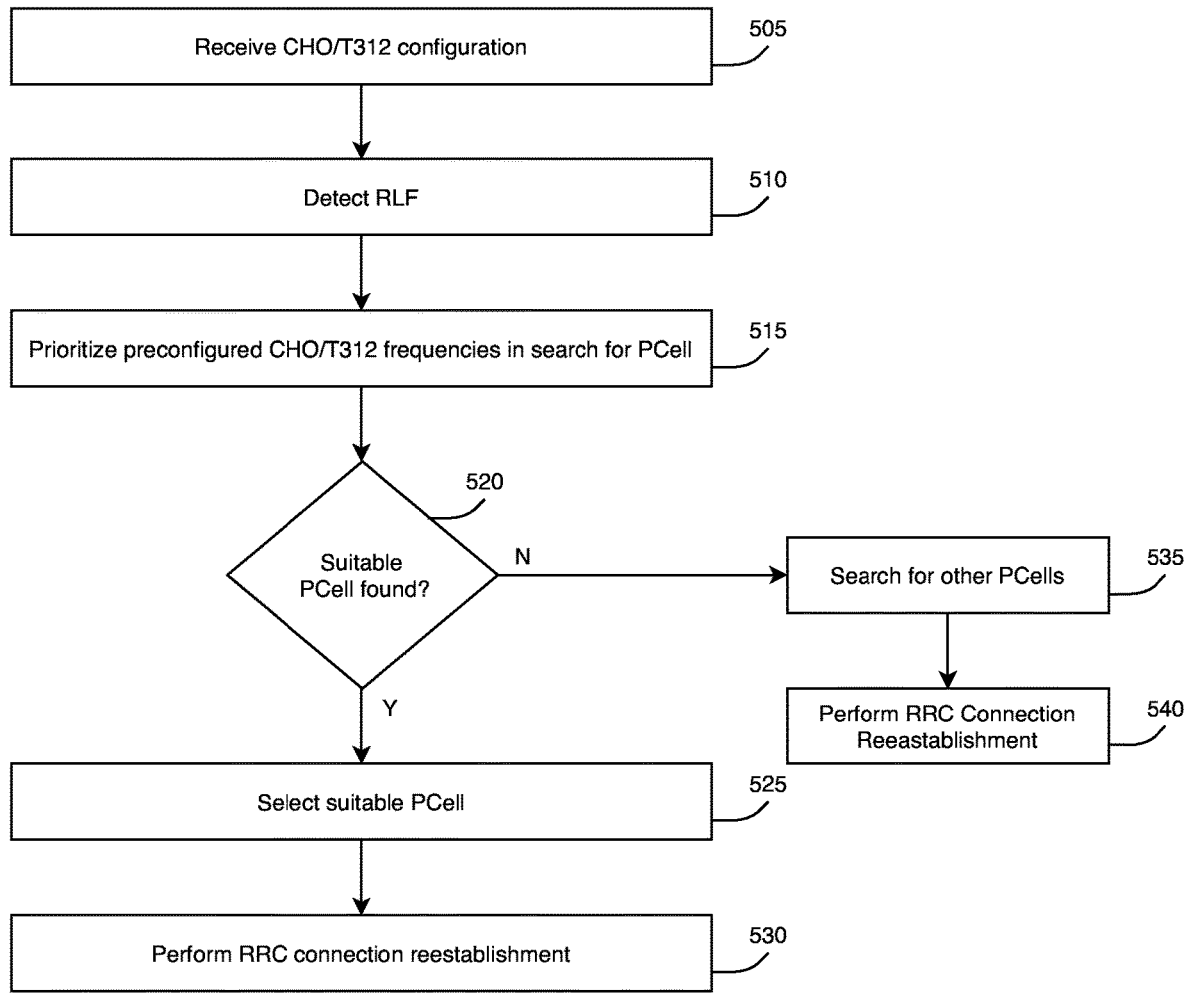
FIG. 5 shows a method of searching for a suitable PCell during an RRC connection reestablishment procedure according to various exemplary embodiments.

FIG. 5 shows a method 500 of searching for a suitable PCell during an RRC connection reestablishment procedure according to various exemplary embodiments. At 505, the UE 110 receives a CHO or T312 configuration. The CHO configuration has been discussed above. A T312 configuration may be associated with one or more measurement objects associated with one or more measurement IDs. These measurement IDs are also associated with one or more measurement report configurations (ReportConfigs) that are configured to use the T312 timer. In some embodiments, the frequencies associated with these measurements IDs trigger the network (e.g., gNB 120A) to send a HO commend to the UE 110.

At 510, the UE 110 detects a radio link failure (RLF) on the serving PCell. At 515, the UE 110 searches for a suitable PCell, but prioritizes frequencies associated with measurement objects corresponding to CHO/T312 configurations. The UE 110 may be configured with multiple measurement objects in addition to CHO/T312 measurement objects. At 520, the UE 110 determines if a PCell has been found on a frequency corresponding to a CHO/T312 measurement object. If a PCell on a CHO/T312 frequency has been found, then the UE 110 selects that PCell at 525 and performs an RRC connection reestablishment with that PCell at 530. If, however, no suitable PCell is found at 520, then the UE 110 searches for PCells on other frequencies corresponding to other measurement objects at 535. At 540, the UE 110 performs the normal RRC connection reestablishment procedure with such a PCell (non-CHO/T312).

Because any PCell on a CHO frequency is a preconfigured CHO PCell, the CHO PCell will be able to retrieve the UE context information from the original serving cell. Similarly, because any PCell on a T312 frequency is a PCell to which the network would trigger the HO command, that PCell will be able to retrieve the UE context information from the original serving cell. As such, by prioritizing the search for a PCell on frequencies corresponding to a CHO or T312 configuration, the probability that the PCell is able to retrieve the UE context information from the original serving cell is increased.

In addition to increasing the probability of finding a CHO PCell and/or of finding a suitable PCell that will be able to successfully retrieve the UE context data from the original serving cell, the methods 500 and 600 may also reduce the time required to find a suitable PCell. For example, in some exemplary embodiments, during a search for a suitable CHO PCell, the UE 110 may skip acquiring the system information block 1 (SIB1), which is typically used for the TS 36.304/38.304 cell suitability check, if one or more predetermined conditions are met. In some exemplary embodiments, the predetermined conditions may include the CHO PCell satisfies the conditional execution/trigger conditions 458, but the CHO execution is not triggered because a TTT timer has not expired. In some exemplary embodiments, the predetermined conditions may include that the SIB1 is already provided in the Conditional RRC Reconfiguration air-message associated with the CHO PCell. Because the UE 110 can avoid acquiring the SIB1 in any of these scenarios, the time spent acquiring the SIB1 for a TS 36.304/38.304 suitability check is avoided, thus reducing the time required to find a suitable PCell.

Figure 6A:
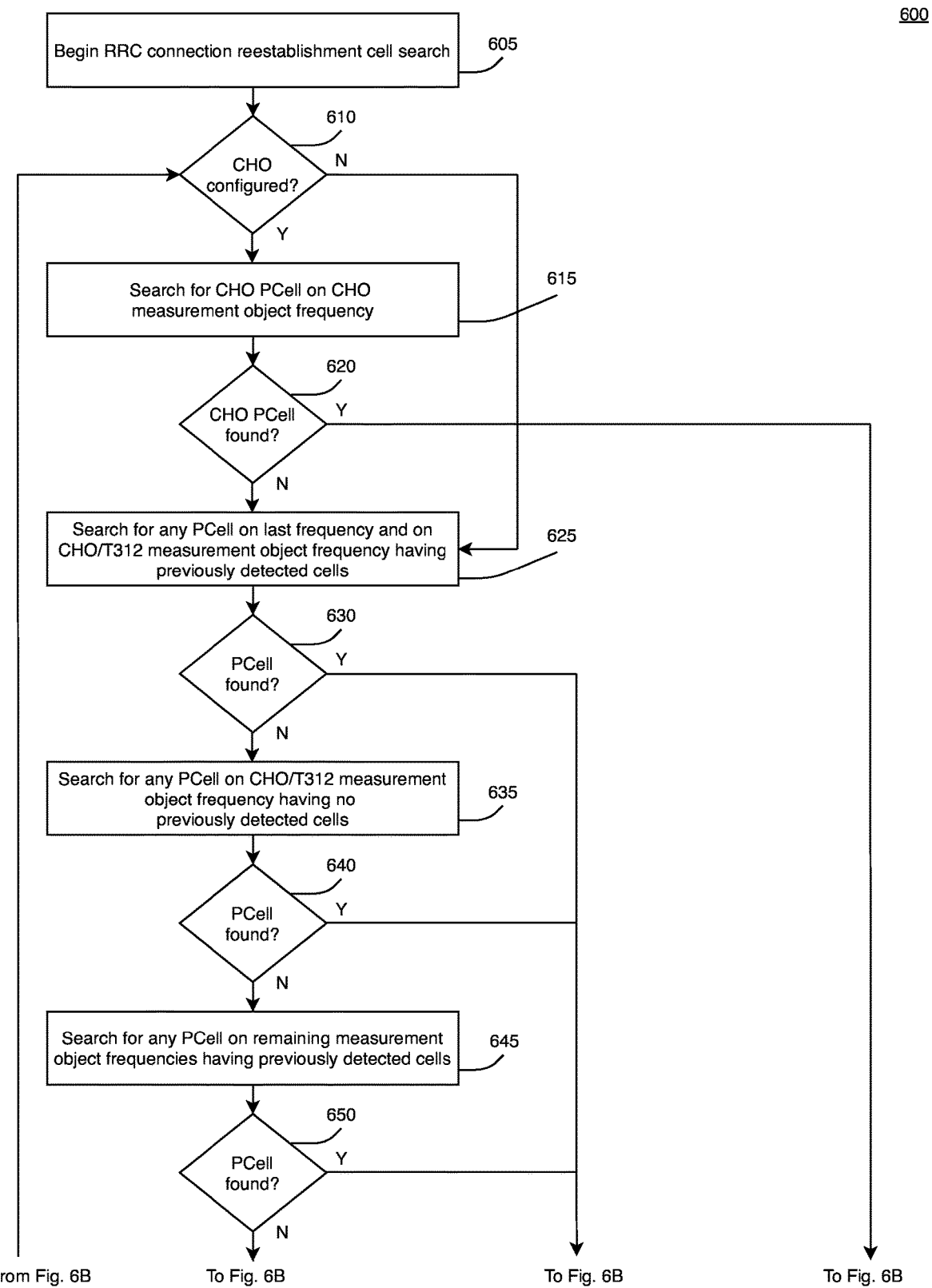
FIGS. 6A and 6B show a method of performing an RRC connection reestablishment procedure according to various exemplary embodiments.
Figure 6B:
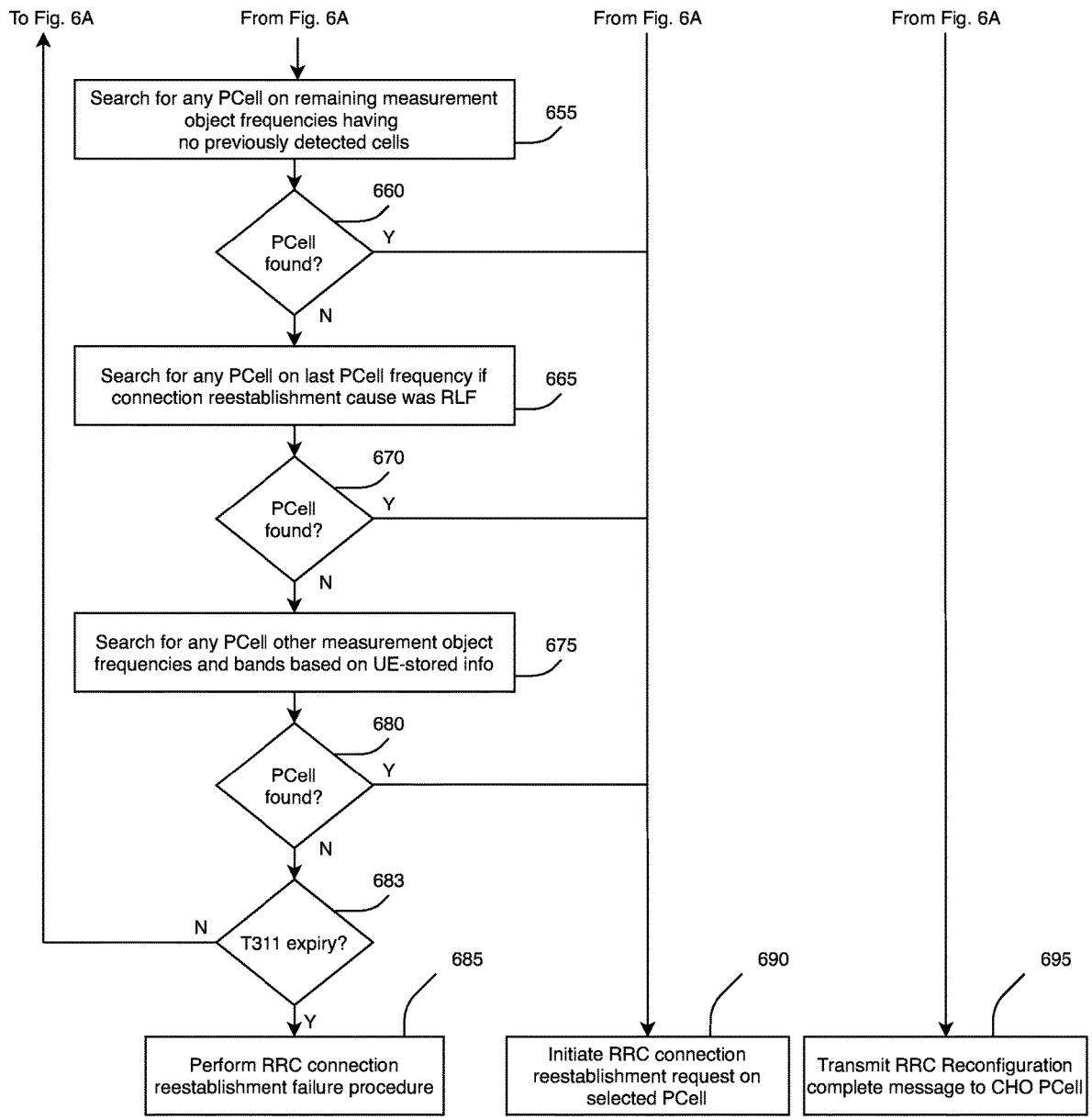

FIGS. 6A and 6B show a method 600 of performing an RRC connection reestablishment according to various exemplary embodiments. The method 600 begins with the RRC connection reestablishment cell search at 605. At 610, the UE 110 determines whether a CHO configuration has been received from the network (e.g., gNB 120A). If the UE 110 has received a CHO configuration, then, at 615, the UE 110 searches for a CHO PCell on frequencies associated with measurement objects identified in the CHO configuration. If more than one candidate frequency is available, then the UE 110 begins with frequencies having the highest power based on CHO PCells that have already been found. If, however, the UE 110 has not received a CHO configuration at 615, then the method 600 proceeds to 625, which is discussed below.

At 620, the UE 110 determines if a CHO PCell has been found. If a CHO PCell has been found, then the UE 110 transmits the RRC reconfiguration complete message to the CHO PCell at 695. If, however, a CHO PCell has not been found, then, at 625, the UE 110 searches for any PCell on (i) the frequency of the original serving cell if the cause for the connection reestablishment is not RLF, and (ii) the frequencies of the measurement objects associated with CHO or T312 configurations having cells that were previously detected by the UE 110 (e.g., during connected mode measurements or previous scan iterations). At 630, the UE 110 determines if a suitable PCell has been found as a result of the search at 625. If a suitable PCell has been found, then the method 600 proceeds to 690, where the UE 110 initiates the RRC connection reestablishment procedure on the that PCell.

If, however, a suitable PCell has not been found, then, at 635, the UE 110 searches for any PCell on frequencies of measurement objects associated with CHO or T312 configurations having cells that were not previously detected by the UE 110. At 640, the UE 110 determines if a suitable PCell has been found as a result of the search at 635. If a suitable PCell has been found, then the method 600 proceeds to 690, where the UE 110 initiates the RRC connection reestablishment procedure on the that PCell.

If, however, a suitable PCell has not been found, then, at 645, the UE 110 searches for any PCell on frequencies of any remaining measurement objects with which the UE 110 is configured and having cells that were previously detected by the UE 110. At 650, the UE 110 determines if a suitable PCell has been found as a result of the search at 645. If a suitable PCell has been found, then the method 600 proceeds to 690, where the UE 110 initiates the RRC connection reestablishment procedure on the that PCell.

If, however, a suitable PCell has not been found, then, at 655, the UE 110 searches for any PCell on frequencies of any remaining measurement objects with which the UE 110 is configured and having cells that were not previously detected by the UE 110. At 660, the UE 110 determines if a suitable PCell has been found as a result of the search at 655. If a suitable PCell has been found, then the method 600 proceeds to 690, where the UE 110 initiates the RRC connection reestablishment procedure on the that PCell.

If, however, a suitable PCell has not been found, then, at 665, the UE 110 searches for any PCell on the frequency of the original serving cell if the cause for the connection reestablishment is RLF. At 670, the UE 110 determines if a suitable PCell has been found as a result of the search at 665. If a suitable PCell has been found, then the method 600 proceeds to 690, where the UE 110 initiates the RRC connection reestablishment procedure on the that PCell.

If, however, a suitable PCell has not been found, then, at 675, the UE 110 searches for any PCell on frequencies of any remaining measurement objects with which the UE 110 is configured and other frequency bands based on information stored on the UE 110. At 680, the UE 110 determines if a suitable PCell has been found as a result of the search at 675. If a suitable PCell has been found, then the method 600 proceeds to 690, where the UE 110 initiates the RRC connection reestablishment procedure on the that PCell.

If, however, a suitable PCell has not been found, then, at 683, the UE 110 determines if a T311 timer that defines the time allowed for a connection reestablishment cell selection has expired. If the T311 timer has expired, then, at 685, the UE 110 performs an RRC connection reestablishment failure procedure. If, however, the T311 timer has not expired, then the method 600 returns to 610, where the UE 110 determines if a CHO configuration has been received.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalents.

The invention claimed is:

1. A processor of a user equipment (UE) configured to perform operations comprising:
   receiving a mobility configuration from a source cell of a network, wherein the mobility configuration includes at least one mobility measurement object;
   determining that a radio link failure (RLF) event has occurred on the source cell;
   searching for a primary cell (PCell) only on frequencies associated with the at least one mobility measurement object to reestablish a radio resource control (RRC) connection;
   determining, when a conditional handover (CHO) PCell is found during the searching, whether the CHO PCell satisfies an A5 event power threshold, wherein the UE continues the searching for the PCell when the CHO PCell does not satisfy the A5 event power threshold; and
   reestablishing the RRC connection with the CHO PCell when the CHO PCell satisfies the A5 event power threshold.

2. The processor of claim 1, wherein the mobility configuration is a conditional handover (CHO) configuration, wherein the at least one mobility measurement object is a CHO measurement object corresponding to at least one target cell.

3. The processor of claim 2, wherein the operations further comprise:
   searching for the PCell on other frequencies not associated with CHO measurement object when the CHO PCell is not found.

4. The processor of claim 2, wherein the operations further comprise:
   omitting acquisition of a system information block 1 (SIB1) of the CHO PCell when the CHO PCell satisfies preconfigured conditions for a CHO execution.

5. The processor of claim 2, wherein the operations further comprise:
   omitting acquisition of a system information block 1 (SIB1) of the CHO PCell when the SIB1 has already been received in an RRC Reconfiguration air-message included in the CHO configuration.

6. The processor of claim 1, wherein, when the CHO PCell satisfies the A5 event power threshold, a cell suitability check is not performed.

7. The processor of claim 1, wherein the operations further comprise:
   transmitting an RRC reconfiguration complete message to the CHO PCell to facilitate reestablishment of the RRC connection.

8. The processor of claim 1, wherein the mobility configuration is a T312 configuration, wherein the at least one measurement object is a T312 measurement object corresponding to a measurement ID, and wherein the measurement ID is associated with a measurement report configuration (ReportConfig) configured to use a T312 timer.

9. The processor of claim 8, wherein the operations further comprise:
   searching for the PCell on other frequencies not associated with the T312 measurement object when the PCell is not found on frequencies associated with the T312 measurement object.

10. A user equipment (UE), comprising:
    a transceiver configured to communicate with a network; and
    a processor communicatively coupled to the transceiver and configured to perform operations comprising:
       receiving a mobility configuration from a source cell of the network, wherein the mobility configuration includes at least one mobility measurement object;
       determining that a radio link failure (RLF) event has occurred on the source cell;
       searching for a primary cell (PCell) only on frequencies associated with the at least one mobility measurement object to reestablish a radio resource control (RRC) connection;
       determining, when a conditional handover (CHO) PCell is found during the searching, whether the CHO PCell satisfies an A5 event power threshold, wherein the UE continues the searching for the PCell when the CHO PCell does not satisfy the A5 event power threshold; and
       reestablishing the RRC connection with the CHO PCell when the CHO PCell satisfies the A5 event power threshold.

11. The UE of claim 10, wherein the mobility configuration is a conditional handover (CHO) configuration, wherein the at least one mobility measurement object is a CHO measurement object corresponding to at least one target cell.

12. The UE of claim 11, wherein the operations further comprise:
    searching for the PCell on other frequencies not associated with CHO measurement object when the CHO PCell is not found.

13. The UE of claim 11, wherein the operations further comprise:
   omitting acquisition of a system information block 1 (SIB1) of the CHO PCell when the CHO PCell satisfies preconfigured conditions for a CHO execution.

14. The UE of claim 11, wherein the operations further comprise:
   omitting acquisition of a system information block 1 (SIB1) of the CHO PCell when the SIB1 has already been received in an RRC Reconfiguration air-message included in the CHO configuration.

15. The UE of claim 10, wherein, when the CHO PCell satisfies the A5 event power threshold, a cell suitability check is not performed.

16. The UE of claim 10, wherein the operations further comprise:
   transmitting an RRC reconfiguration complete message to the CHO PCell to facilitate reestablishment of the RRC connection.

17. The UE of claim 10, wherein the mobility configuration is a T312 configuration, wherein the at least one measurement object is a T312 measurement object corresponding to a measurement ID, and wherein the measurement ID is associated with a measurement report configuration (ReportConfig) configured to use a T312 timer.

18. The UE of claim 17, wherein the operations further comprise:
   searching for the PCell on other frequencies not associated with the T312 measurement object when the PCell is not found on frequencies associated with the T312 measurement object.

\* \* \* \* \*